(12) United States Patent
Rudelic

(10) Patent No.: US 7,603,587 B2
(45) Date of Patent: Oct. 13, 2009

(54) UPDATING A MEMORY BLOCK WITHOUT STATUS LOGGING

(75) Inventor: John Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 440 days.

(21) Appl. No.: 11/441,576

(22) Filed: May 26, 2006

(65) Prior Publication Data

US 2008/0005503 A1  Jan. 3, 2008

(51) Int. Cl.
G06F 11/00 (2006.01)
G06F 11/10 (2006.01)

(52) U.S. Cl. ............ 714/37; 714/45; 711/156; 707/203; 707/204

(58) Field of Classification Search .......... 714/18, 714/751, 768, 803, 821, 824, 37, 45; 711/156; 707/202, 203
See application file for complete search history.

(56) References Cited

U.S. PATENT DOCUMENTS

| | | | | |
|---|---|---|---|---|
| 5,559,991 A * | 9/1996 | Kanfi | | 711/162 |
| 5,754,567 A * | 5/1998 | Norman | | 714/773 |
| 5,765,173 A * | 6/1998 | Cane et al. | | 707/204 |
| 5,802,592 A * | 9/1998 | Chess et al. | | 711/164 |
| 5,974,529 A * | 10/1999 | Zumkehr et al. | | 712/41 |
| 6,279,128 B1 * | 8/2001 | Arnold et al. | | 714/49 |
| 6,282,175 B1 * | 8/2001 | Steele et al. | | 370/254 |
| 6,549,457 B1 | 4/2003 | Srinivasan et al. | | |
| 6,725,419 B1 * | 4/2004 | Barthel et al. | | 714/807 |
| 6,847,982 B2 * | 1/2005 | Parker et al. | | 707/200 |
| 6,917,543 B2 * | 7/2005 | Sato | | 365/185.22 |
| 7,117,326 B2 | 10/2006 | Rudelic | | |
| 7,155,590 B2 * | 12/2006 | Mathis | | 711/164 |
| 7,269,706 B2 * | 9/2007 | Agarwal et al. | | 711/173 |
| 2002/0065978 A1 * | 5/2002 | Mattison | | 711/1 |
| 2002/0073276 A1 * | 6/2002 | Howard et al. | | 711/113 |
| 2003/0056139 A1 * | 3/2003 | Murray et al. | | 714/4 |
| 2005/0071731 A1 | 3/2005 | Atri et al. | | |
| 2005/0286306 A1 | 12/2005 | Srinivasan et al. | | |
| 2006/0002197 A1 | 1/2006 | Rudelic | | |
| 2006/0026569 A1 * | 2/2006 | Oerting et al. | | 717/126 |
| 2006/0069849 A1 | 3/2006 | Rudelic | | |
| 2007/0261050 A1 * | 11/2007 | Nakano et al. | | 717/172 |

OTHER PUBLICATIONS

Wikipedia's Hamming Code http://en.wikipedia.org/wiki/Hamming_code retrieved Sep. 30, 2008.*
Rudelic et al—U.S. Appl. No. 11/237,305, filed Sep. 27, 2005.
Wang et al—U.S. Appl. No. 11/218,371, filed Sep. 2, 2005.
Rudelic—U.S. Appl. No. 11/130,759, filed May 17, 2005.

* cited by examiner

Primary Examiner—Scott Baderman
Assistant Examiner—Joseph Schell
(74) Attorney, Agent, or Firm—Trop, Pruner & Hu, P.C.

(57) ABSTRACT

A technique to update a memory block without status logging is presented. An update file includes a pre-update and a post-update information verification code (IVC) for each block to be updated. By comparing the IVCs to an IVC of a block of memory, an update status may be determined.

4 Claims, 3 Drawing Sheets

UPDATING A MEMORY BLOCK WITHOUT STATUS LOGGING

BACKGROUND

Description of the Related Art

Embodiments of the present invention relate generally to memory devices. Memory devices are used in many different types of systems to store software and data.

Many systems, such as handheld or portable devices, use memory devices to store operational software and configuration data. The software and data occasionally needs updating. One common method of updating information stored in the memory of a portable device is through over the air (OTA) updates where update information is communicated wirelessly to the portable device by a service provider. OTA updates may be interrupted, for example, due to loss of signal or power to the portable device. Failsafe methods are needed for OTA updates in case an update is interrupted and needs to be restarted. Current update agents track progress of an update by logging the progress in a dedicated block of memory. If the update is interrupted, the current progress is checked, and the update continues from the point of interruption.

Flash memory is often used to store the operational software in portable devices due to its large, non-volatile storage capacity. Updating flash memory is complicated due to the inability to overwrite old information without first erasing the old information. Thus, to update information stored in memory, the information is read from a first block, modified, and written to a second block. The first block must be erased prior to writing any new information. This complication increases the amount of time required for an OTA update and therefore the likelihood that an update may be interrupted.

Further, in the current OTA update method, at least two blocks of memory must be dedicated for the updates, one block for status logging and another block for the update process.

Thus, there is a desire to make memory updates more efficient.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

According to embodiments of the present invention, a mechanism for an Over-The-Air (OTA) update management process that does not need to write to a dedicated block of memory for status logging during the update process is disclosed. The mechanism uses an update file that provides information to the update agent that allows the update agent to determine the state of the update process. The update agent may be a software application resident on a portable device that is responsible for applying the OTA update.

Figure 1:
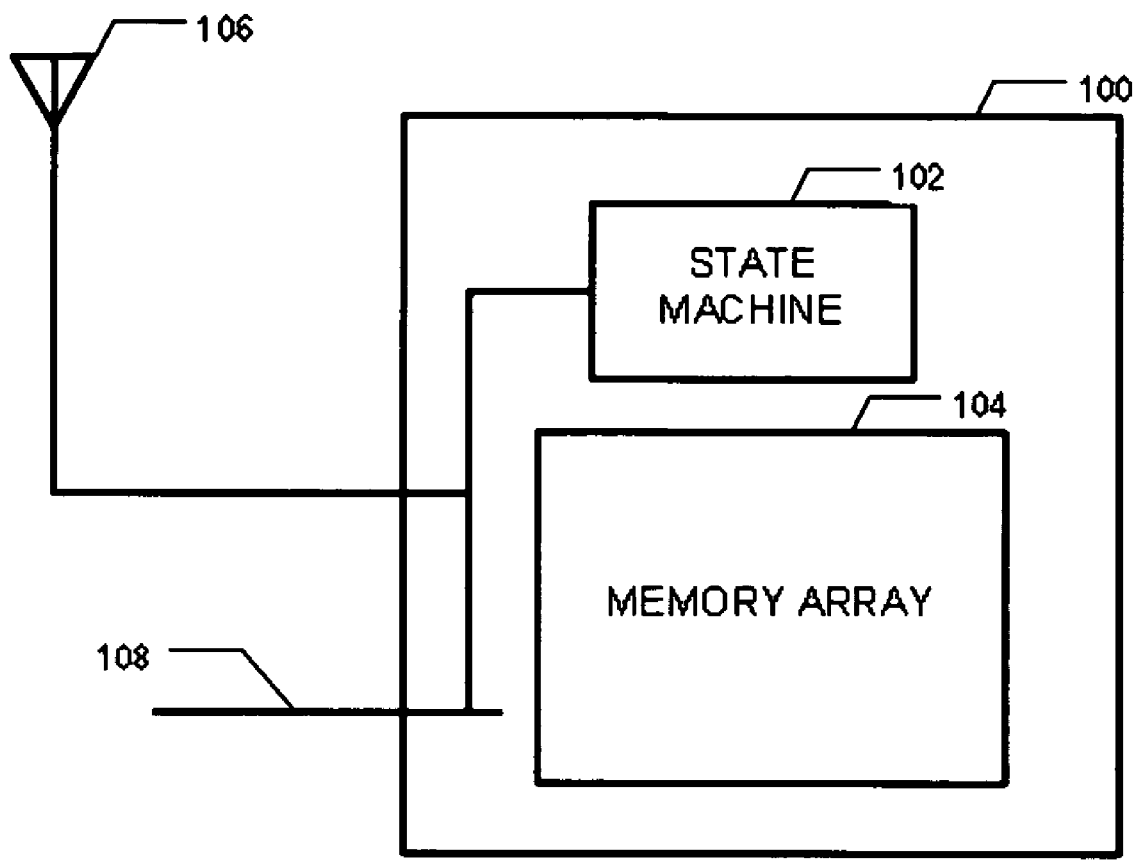
FIG. 1 illustrates a block diagram of a portable device according to an embodiment of the present invention.

FIG. 1 illustrates a block diagram of a portable device according to an embodiment of the present invention. Device 100 includes a state machine 102 and a memory array 104. State machine 102 and memory array 104 may be included on a single integrated circuit or may be separate components. Memory array 104 may be used to store an operating system and/or other software or information that may need to be occasionally updated. Device 100 may include an antenna 106 and an input/output (IO) port 108. Device 100 may receive over the air (OTA) updates via antenna 106. Device 100 may alternatively or additionally receive an update via IO port 108. State machine 102 controls the update of information stored in memory array 104. State machine 102 may be the main processor for device 100 or may be a processor or simple state machine dedicated for use with memory array 104. Device 100 may include other components such as an additional processor, IO components, and other components not relevant to the current discussion.

Figure 2:
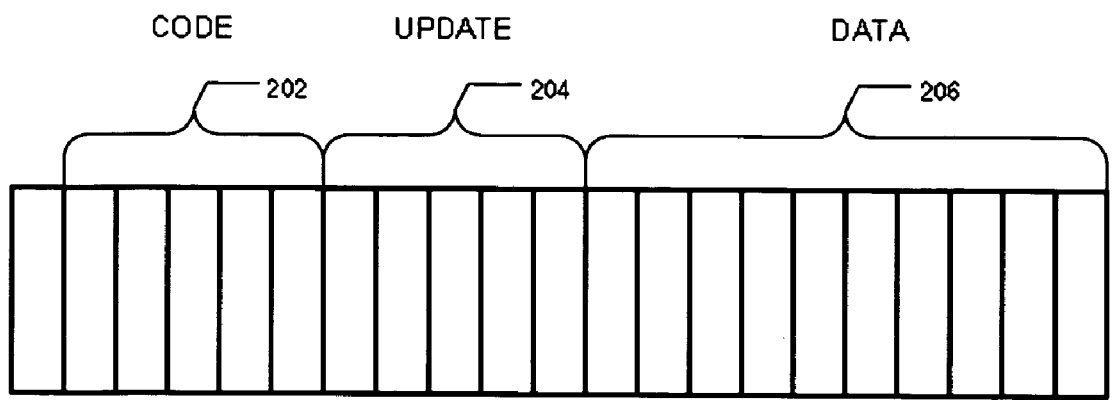
FIG. 2 illustrates an example of a memory layout according to an embodiment of the present invention.

FIG. 2 illustrates an example of a memory layout according to an embodiment of the present invention. Memory array 104 may be partitioned into multiple segments, each segment consisting of one or more blocks 202 for the storage of code, one or more blocks 204 for the storage and usage of an update file, and one or more blocks 206 for the storage of other data. One of blocks 204 may be reserved for block erase functionality during an update.

The memory layout of memory array 104 as depicted in FIG. 2 is merely illustrative. Alternate layouts may be used according to embodiments of the present invention.

According to embodiments of the present invention, an update file is communicated by, for example, a service provider to provide information that an update agent can use to determine the state, or progress, of an update process.

Figure 3:
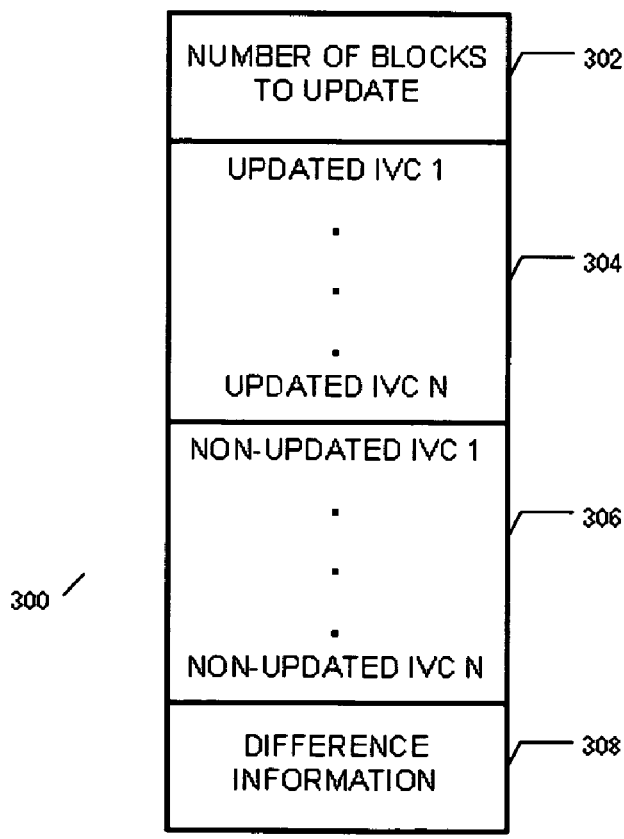
FIG. 3 illustrates an example of an update file according to an embodiment of the present invention.

FIG. 3 illustrates an example of an information layout of an update file according to an embodiment of the present invention. Update file 300 may include the number of blocks to be updated 302, multiple information verification codes (IVCs) 304 for updated blocks, multiple IVCs 306 for non-updated blocks, and difference information 308 which includes information used to update each block. The IVCs are codes used to verify the data stored in a block. If the block is not updated, the IVC of the non-updated block will match the non-updated IVC transmitted in the update file. If the block is updated, the IVC of the updated block will match the updated IVC transmitted in the update file. If the IVC of the block matches neither IVC in the update file, an update may have only been partially completed. The IVCs may be hash codes, error correction codes (ECC), or some other form of verification coding used to verify correct information is stored.

The update file 300 as depicted in FIG. 3 is merely illustrative. Alternate layouts may be used according to embodiments of the present invention.

Figure 4:
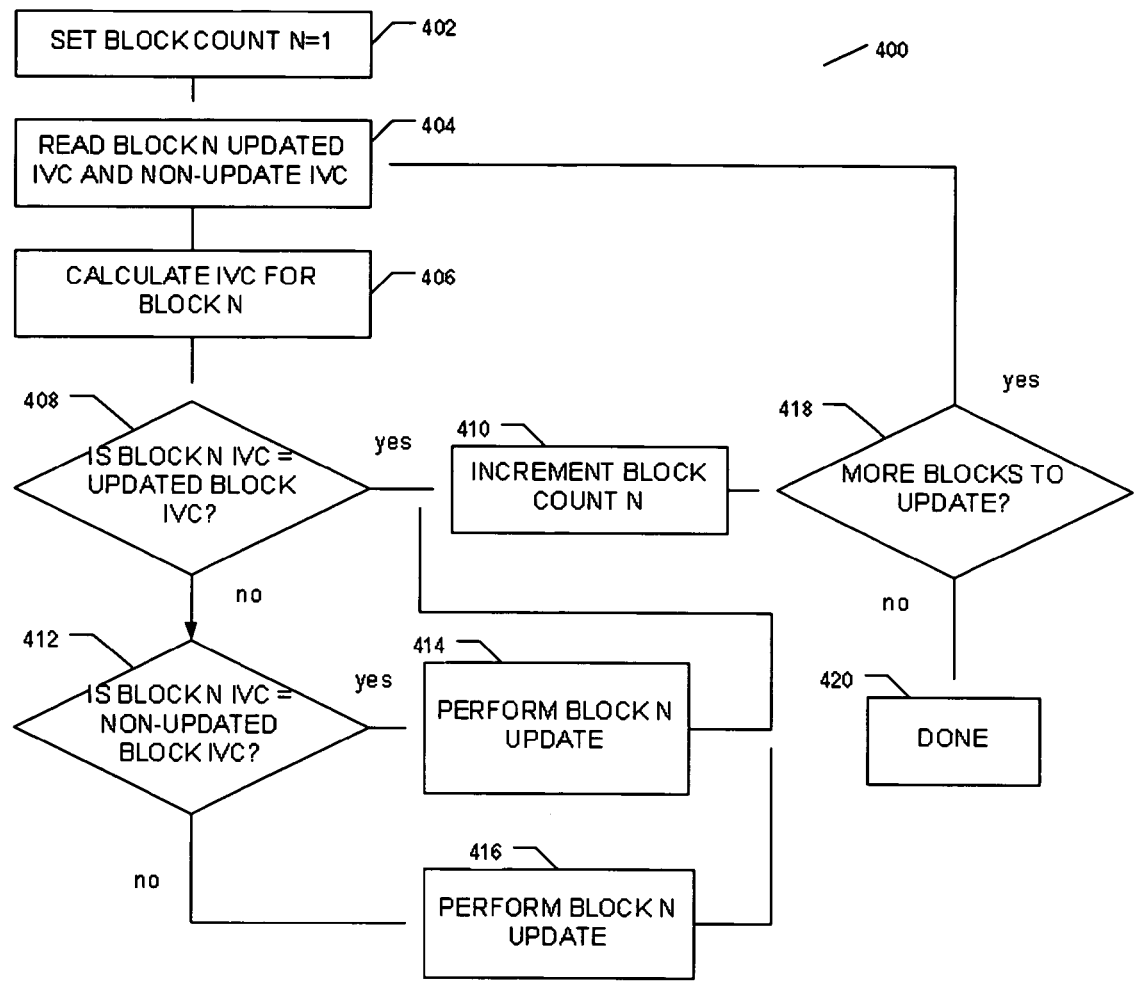
FIG. 4 illustrates a flow diagram of an update process according to an embodiment of the present invention.

FIG. 4 illustrates a flow diagram of an update process according to an embodiment of the present invention. According to an embodiment of the present invention, an update agent determines the list of blocks that need updating from the update file. The update agent calculates the IVC of the first block. If the IVC matches the non-updated (or pre-update) IVC for the block then the block has not been modified. If the IVC matches the updated (or post-update) IVC then the block has already been updated. If the IVC of the block does not match either IVC for the block from the update file, then that block was in process of being updated and the update for that block is restarted. Due to the nature of flash writes, the pre-update block itself has not been modified and can be found in the OTA spare block. The partially updated block is discarded.

Referring to FIG. 4, utilizing information in the update file, flow 400 updates information stored in a memory. Flow 400 begins with setting a block count N equal to one, block 402. The update IVC and non-update IVC for block N is read from the update file, block 404. The IVC for block N is calculated, block 406. A determination is made whether the IVC for block N is equal to the updated IVC, block 408. If equal, block count N is incremented, block 410. If not equal, a determination is made whether the IVC for block N is equal to the non-updated IVC, block 412. If equal, block N is updated using the difference information, block 414. To update block N, a new block is written, combining information from block N and the difference information from the update file. If not equal, the update of block N was interrupted. Thus, the pre-update block N is updated using the difference information, block 416. After block 414 or 416 is performed, block count N is incremented, block 410. After block count N is incremented, a determination is made whether there are more blocks needing update, block 418. If so, the flow returns to block 404, read block N update IVC and non-update IVC. Otherwise, flow 400 is complete, block 420.

The IVC information in the update package allows the update agent to determine the state of the update process without a need for status logging. Further, the need for a dedicated block of memory for writing/tracking the progress of the update process is eliminated. Additionally, the OTA update application process becomes more efficient because tracking writes and erases have been eliminated.

According to an embodiment of the present invention, an update process can be restarted from any point due to the information in the update file that allows the system to determine the progress of an update and to continue from that point.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. An apparatus comprising:
    a memory having a first portion to store a received update file, the update file including a pre-update information verification code (IVC), a post-update IVC, and difference information; and
    a state machine configured to use the IVCs to determine a status of an update to a second portion of the memory, wherein to update the portion of memory, the state machine is further configured to:
    calculate a current IVC of a block of memory; and
    compare the current IVC with one of pre-update and post-update IVCs.

2. The apparatus as recited in claim 1, wherein if the current IVC and the pre-update IVC are not equal and the current IVC and a post-update IVC are not equal, the block has been partially updated.

3. The apparatus as recited in claim 1, wherein the difference information is used to update the information stored in the second portion of the memory.

4. A system comprising:
an antenna to receive an update file;
a memory having a first portion to store the update file, the update file including a pre-update information verification code (IVC), a post-update IVC, and difference information; and
a state machine configured to use the IVCs to determine a status of an update to a second portion of the memory, wherein to update the portion of memory, the state machine is further configured to:
calculate a current IVC of a block of memory; and
compare the current IVC with one of said IVCs.

* * * * *